(12) United States Patent
Kimblad et al.

(10) Patent No.: US 12,036,611 B2
(45) Date of Patent: Jul. 16, 2024

(54) SINTERING METHOD, MANUFACTURING METHOD, OBJECT DATA PROCESSING METHOD, DATA CARRIER AND OBJECT DATA PROCESSOR

(71) Applicant: Digital Metal AB, Höganäs (SE)

(72) Inventors: Hans Kimblad, Höganäs (SE); Cornelia Olsérius, Höganäs (SE); Niclas Malm, Höganäs (SE)

(73) Assignee: DIGITAL METAL AB, Höganäs (SE)

( * ) Notice: Subject to any disclaimer, the term of this patent is extended or adjusted under 35 U.S.C. 154(b) by 0 days.

(21) Appl. No.: 17/748,825

(22) Filed: May 19, 2022

(65) Prior Publication Data

US 2022/0274177 A1    Sep. 1, 2022

Related U.S. Application Data

(63) Continuation of application No. 15/543,560, filed as application No. PCT/EP2016/050361 on Jan. 11, 2016, now abandoned.

(30) Foreign Application Priority Data

Jan. 14, 2015   (GB) ..................................... 1500608

(51) Int. Cl.
 *B22F 10/47* (2021.01)
 *B22F 3/10* (2006.01)
 (Continued)

(52) U.S. Cl.
 CPC ............ *B22F 3/1021* (2013.01); *B22F 10/14* (2021.01); *B22F 10/43* (2021.01); *B22F 10/47* (2021.01);
 (Continued)

(58) Field of Classification Search
 CPC .................................. B22F 10/40; B22F 10/47
 See application file for complete search history.

(56) References Cited

U.S. PATENT DOCUMENTS

| 2005/0079086 A1 | 4/2005 | Farr et al. |
| 2006/0083652 A1 | 4/2006 | Liu et al. |
| (Continued) | | |

FOREIGN PATENT DOCUMENTS

| CN | 102407332 A | 4/2012 |
| CN | 102554234 A | 7/2012 |
| (Continued) | | |

OTHER PUBLICATIONS

Gibson, D.W., et al., "Additive Manufacturing Technologies: Rapid Prototyping to Direct Digital Manufacturing", 2010, pp. 126-129, Springer, New York (Year: 2010).*

(Continued)

*Primary Examiner* — Christopher S Kessler
(74) *Attorney, Agent, or Firm* — Lando & Anastasi, LLP

(57) ABSTRACT

A method is provided of sintering a green object body to form a manufactured object. The method comprises providing a green object body. The green object body comprises granular construction material bound together by a binder. The method comprises providing a green support body for supporting the green object body. The green support body comprises granular construction material bound together by a binder. The method comprises supporting the green object body with the green support body. The method comprises sintering the green support body together with the green object body supported by the green support body. A method of manufacturing an object, a method of processing object data, a data carrier carrying program instructions and an object data processor are also provided.

11 Claims, 5 Drawing Sheets

(51) Int. Cl.
  *B22F 10/14* (2021.01)
  *B22F 10/43* (2021.01)
  *B29C 64/165* (2017.01)
  *B33Y 10/00* (2015.01)
  *B33Y 50/00* (2015.01)
  *B22F 12/55* (2021.01)

(52) U.S. Cl.
  CPC ............ *B29C 64/165* (2017.08); *B33Y 10/00* (2014.12); *B33Y 50/00* (2014.12); *B22F 2003/1042* (2013.01); *B22F 12/55* (2021.01); *Y02P 10/25* (2015.11)

(56) References Cited

U.S. PATENT DOCUMENTS

| | | |
|---|---|---|
| 2008/0075619 A1 | 3/2008 | Hosamani et al. |
| 2009/0311124 A1 | 12/2009 | Lyons |
| 2010/0042241 A1 | 2/2010 | Inoue |
| 2013/0244040 A1 | 9/2013 | Oshima |
| 2014/0227123 A1 | 8/2014 | Günster et al. |
| 2016/0368224 A1 | 12/2016 | Doba et al. |

FOREIGN PATENT DOCUMENTS

| | | |
|---|---|---|
| CN | 103764237 A | 4/2014 |
| CN | 103920877 A | 7/2014 |
| EP | 1201404 A2 | 5/2002 |
| EP | 1486318 A2 | 12/2004 |
| EP | 3015251 A1 | 5/2016 |
| FR | 2994721 A1 | 4/2009 |
| JP | 2005533177 A | 11/2005 |
| JP | 2013184405 A | 9/2013 |
| JP | 2014522331 A | 9/2014 |
| WO | 2005030415 A2 | 4/2005 |
| WO | 2014068579 A1 | 5/2014 |
| WO | 2014208743 A1 | 12/2014 |

OTHER PUBLICATIONS

International Search Report and Written Opinion for PCT/EP2016/050361 Mailed Apr. 26, 2016 10 pages.
Search Report; Sep. 7, 2015; 4 Pages.
Taiwanese Office Action, Jan. 9, 2019, 20 Pages.
Chinese Office Action, Dec. 11, 2018, 49 Pages.
Chinese Office Action dated Dec. 24, 2019 with English summary for co-pending Chinese Patent Application No. 201680005920.X; pp. 25.
Taiwanese Office Action dated Jan. 6, 2020 with English summary for co-pending Taiwanese Patent Application No. 105100596, 29 Pages.
Japanese Office Action dated Dec. 24, 2019 with English summary for co-pending Japanese Patent Application No. 2017-533758; pp. 18. All pages relevant.
Japanese Office Action dated Apr. 14, 2020 with English summary for co-pending Japanese Patent Application No. 2017-533758; pp. 12. All pages relevant.
Japanese Office Action dated Nov. 24, 2020 for co-pending Japanese Patent Application No. 2017-533758; pp. 8. All pages relevant.
USPTO Final Office Action dated Jun. 24, 2021 with U.S. Appl. No. 15/543,560; 8 pages.

* cited by examiner

SINTERING METHOD, MANUFACTURING METHOD, OBJECT DATA PROCESSING METHOD, DATA CARRIER AND OBJECT DATA PROCESSOR

PRIORITY CLAIM

This present application is a continuation of U.S. application Ser. No. 15/543,560, filed Jul. 13, 2017, which claims priority to PCT Application Serial No. PCT/EP2016/050361 filed Jan. 11, 2016, which claims priority to Great Britain Application Serial No. 1500608.3 filed Jan. 14, 2015, the contents of which are hereby incorporated by reference.

TECHNICAL FIELD

The present disclosure relates to a sintering method, and particularly to a sintering method of sintering a green object body to form a desired object. Especially, the present disclosure is applicable to the sintering of green objects produced by additive manufacturing methods in which a granular material, such as a metal powder, is deposited in layers into a build region, portions of each layer being bound together during or after deposition of each layer to form portions of an object, thereby forming the object in the build region from the series of layers. The bound portions of each layer of the object are typically also bound to bound portions of the previous layer such that the object is formed in a contiguous fashion through the successively deposited layers. The binding is typically carried out by selective deposition of a binder. The present disclosure also relates to a method of manufacturing an object incorporating the sintering method, a method of processing object data for use in the object manufacturing method, and a data carrier and object data processor for implementing the data processing method.

BACKGROUND

Additive manufacturing methods, in which a desired object is built up by binding portions of a construction material together to form the object, are widely considered as providing an important and advantageous alternative to traditional subtractive manufacturing methods, in which a desired object is formed by removing portions of material to define the surface of the object.

In many varieties of additive manufacturing, a construction material is deposited into a build region as a series of layers, portions of each layer being bound together and being also bound together with the previously bound portions of a layer below, in order to build up a desired object to be manufactured. One particular class of additive manufacturing, often termed 3D printing, involves the deposition of sequential layers of granular material into a build region, and the selective joining of portions of layers together, either after or during the deposition of each layer, by the selective application of a liquid binder from, for example, an ink-jet head arranged to travel across the deposited layer and arranged to selectively deposit binder at desired locations on each deposited layer.

One class of 3D printing technologies uses a granular construction material, such as a metal or non-metal powder, which forms a so-called green body after application of binder, the green body being subsequently sintered under suitable conditions such as the application of increased temperature and/or pressure. Sintering the green body reduces the relative porosity and increases the density of the body, and thereby improves the mechanical properties, such as strength, of the body.

However, when sintering a green body to form the manufactured object, deformation of the object sometimes occurs. Therefore, there is a need to reduce the incidence of deformation of green body during the sintering process.

SUMMARY

According to a first aspect of the present disclosure, there is provided a method of sintering a green object body to form a manufactured object. The method comprises providing a green object body. The green object body comprises granular construction material bound together by a binder. The method comprises providing a green support body for supporting the green object body. The green support body comprises granular construction material bound together by a binder. The method comprises supporting the green object body with the green support body. The method comprises sintering the green support body together with the green object body supported by the green support body.

According to a second aspect of the present disclosure, there is provided a method of manufacturing an object. The method comprises depositing a first plurality of layers of a construction material. The method comprises selectively binding portions of each deposited layer of the first plurality of layers to form a green support body. The method comprises depositing a second plurality of layers of a construction material. The method comprises selectively binding portions of each deposited layer of the second plurality of layers to form a green object body supported by the green support body. The method comprises sintering the green support body together with the green object body supported by the green support body.

In one implementation, the green object body and the green support body exhibit substantially the same percentage of linear shrinkage during the sintering.

In one implementation, the method further comprises a debinding process of the green object body supported by the green support body before the sintering process.

In one implementation, the green support body and the green object body are formed of the same construction material bound by the same binder.

According to a third aspect of the present disclosure, there is provided a method of processing object data. The method comprises obtaining object data representing an object body to be manufactured. The method comprises generating support data based on the object data, the support data representing a support body for supporting the green object body. The method comprises combining the support data and the object data to obtain combined data representing the object body supported by the support body. The method comprises outputting the combined data.

In one implementation, the green support body has a planar base surface on which it is able to rest while supporting the object body.

In one implementation, the green support body has a supporting surface for supporting the green object body, the supporting surface provides an intermittent contact surface with the green object body.

In one implementation, the intermittent contact surface is formed by at least one of projections, recesses or corrugations of the supporting surface.

In one implementation, the green support body is adapted to conform to the shape of the green object body.

In one implementation, the green support body is adapted to contact the green object body at a plurality of positions on the green object body.

In one implementation, the green support body is dimensioned so as to support the entirety of the green object body.

In one implementation, the green support body is connected to the green object body by binder.

In one implementation, the green support body is separate from the green object body.

According to a fourth aspect of the present disclosure, there is provided a data carrier carrying program instructions configured, when executed, to cause a data processor to perform a method in accordance with the third aspect.

According to a fifth aspect of the present disclosure, there is provided an object data processor. The processor comprises an object data obtaining unit operable to obtain object data representing an object body to be manufactured. The processor comprises a support data generating unit operable to generate support data based on the object data. The support data represents a support body for supporting the green object body. The processor comprises a combining unit operable to combine the support data and the object data to obtain combined data representing the object body supported by the support body. The processor comprises a combined data outputting unit for outputting the combined data.

BRIEF DESCRIPTION OF THE DRAWINGS

For a better understanding of the present disclosure, and to show how the same may be carried into effect, reference will be made, by way of example only, to the accompanying Drawings, in which.

DETAILED DESCRIPTION

Figure 1:
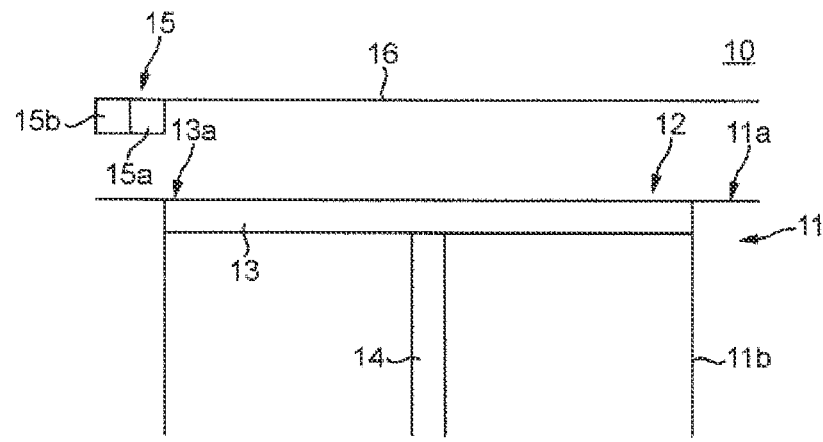
FIGS. 1 to 6 represent steps in an additive manufacturing process.

FIG. 1 shows a manufacturing apparatus in which the concept of the present disclosure may be implemented. The apparatus 10 of FIG. 1 has a table 11 with an upper surface 11a. Here, upper surface 11a is planar. Set into the surface 11a of table 11 is a recessed well 12, the sides of which are defined by side walls 11b extending in a perpendicular direction from the surface 11a of the table. Arranged in well 12 and having an extent in the plane of the surface of the table (XY plane) matching that of the well is support plate 13. Support plate 13 also has a planar upper surface 13a and is movably arranged in well 12 such that the depth of the well in a direction (Z direction) perpendicular to the surface 11a of table 11 such that the depth of the well, between surface 11a of table 11 and surface 13a of support plate 13 is variable. For example, support plate 13 may be movable by means of a piston 14, which is adapted to raise and lower support plate 13 in accordance with instructions from a control unit (not shown) of the apparatus.

Although FIG. 1 is drawn in cross-section (cross-section in the XZ plane), the well, table and plate all have extension in the direction into the page (Y direction). For example, the well 12, and accordingly the support plate 13, may be rectangular, square, circular, oval, or may have some other shape when viewed in a direction perpendicular to the surface 11a of table 11, that is, into the well.

Of course, although the surface of table 11 is here disclosed as planar, the surface may be curved or inclined, and in some configurations may be slightly inclined upwardly or downwardly away from the well.

Above the surface of table 11, a print head 15 is arranged to translate in at least the X direction. For example, rail 16 may be provided, extending in the X direction, along which print head 15 may be arranged to translate by means of, for example, pulleys, rack-and-pinion drive, or worm screw drive. Print head 15 may be movable under the control of a control unit of the apparatus. Print head 15 here has two dispensing components, a construction material deposition unit 15a which is arranged to deposit a granular construction material into well 12 as the print head 15 traverses well 12, and a binder deposition unit 15b, arranged to dispense a binder, such as a liquid binder, at selected locations in well 12 as the print head 15 traverses well 12 to bind portions of the previously-deposited granular construction material together.

Each of construction material deposition unit 15a and binder deposition unit 15b may be coupled to an appropriate material reservoir, each of which may be provided as part of print head 15, or may be arranged at another part of apparatus 10, or may be externally provided.

Print head 15 may be arranged to translate only in one direction (X direction), forward and reverse, across well 12, or may also be arranged to translate in another direction at an angle, for example a perpendicular direction (Y direction), to the first direction.

In the present configuration, print head 15 is arranged to travel only in one direction (X direction) above well 12. To allow construction material deposition unit 15a to deposit the granular construction material across the full width of well 12 in a direction perpendicular to the translation direction of print head 15 (Y direction), the construction material deposition unit 15a may have extent in a direction perpendicular to the direction of travel of print head 15 (Y direction) the same as or larger than the maximum width direction of well 12 and may provide one or more construction material deposition positions from which construction material may be dispensed under control of the control unit so as to deposit an even layer of powder across the width of the well. For example, construction material deposition unit 15a may have a single large dispense orifice in the shape of a slit extending across the full width of well 12, or may be provided with several smaller dispense orifices arranged in an array across the width of well 12, being sufficiently closely spaced so as to deposit an even layer of powder into the well.

By such configurations, as print head 15 traverses along rail 16 across well 12, a substantially uniform layer of powder may be dispensed into the well, the thickness of which may be determined by the rate at which the granular construction material is dispensed from the construction material deposition unit 15a and by the speed at which print head 15 traverses well 12.

Print head 15 may also be provided with a smoothing device, such as a doctor blade or smoothing roller, which may be arranged behind the construction material deposition unit 15a relative to a forward direction (X direction) in which print head 15 moves while dispensing construction material from construction material deposition unit 15a so as to smooth any irregularities in the depth of the layer of construction material deposited during that movement. The smoothing unit may be retractable relative to print head 15, or may be fixed in height relative to the surface 11a of table 11 or relative to the height of the one or more dispensing orifices of construction material deposition unit 15a.

Binder deposition unit 15b is arranged behind construction material deposition unit 15a relative to the direction of travel in which print head 15 travels while depositing construction material from construction material deposition unit 15a. Binder deposition unit 15b is adapted to selectively deposit binder at various locations in in well 12 so as to bind portions of previously deposited construction material together to form joined regions in a deposited layer.

In the present configuration, binder deposition unit 15b is an ink-jet type print head arranged to jet droplets of binder according to commands from the control unit of the apparatus. Binder deposition unit 15b may provide a set of orifices extending across the width direction of well 12 at a predetermined spacing, each of which being individually controllable so as to selectively deposit binder at different positions across a deposited layer as the print head 15 traverses across well 12 along rail 16. In another configuration, binder deposition unit 15b may only have one or a smaller number of orifices from which binder may be jetted, and may be arranged to translate across print head 15 in a direction perpendicular to the direction of travel of print head 15 across well 12. In the first configuration, the position at which binder is deposited is determined by the orifice which is activated to deposit binder and the position of print head 15 across well 12, while in the second configuration the position of binder deposition unit 15B across the width direction of well 12 also determines the location at which binder is deposited.

In some configurations, the print head 15 makes a first pass from an initial position across well 12 in which a layer of construction material is deposited, followed by a return to the initial position and then a second pass in the same direction in which binder is deposited onto the previously-deposited layer. In another configuration, the construction material is deposited from construction material deposition unit 15a and binder is selectively deposited from binder deposition unit 15b in the same pass, before the entire layer has been deposited. The latter of these two configurations is adopted in the following, although the former is an alternative implementation.

If the binder deposited by the binding unit 15B requires no specific curing treatment, for example, if the binder cures on contact with air or if the binder is formed by the combination of two simultaneously or subsequently jetted components which together react and cure, no additional curing unit is required. However, the binder may, for example, be radiation curable, and may require the application of, for example, ultraviolet light to harden and cure the binder. In such a configuration, print head 15 may include a curing unit arranged behind that binder deposition unit in a forward direction in which the print head 15 moves when depositing binder, so that binder deposited by the binder deposition unit 15b may be cured by the application of UV light from the curing unit. In the present configuration, it is assumed that the binder which is used requires no curing unit, and accordingly no curing unit is shown.

In a further possible configuration, the binder is heat-curable, and the printing apparatus may be configured to raise the temperature of the well to bake and cure the binder.

The movement of the print head, the activation of the construction material deposition unit, and the activation and control of the binder deposition unit may all be individually controlled by the control unit of the apparatus such that a uniform layer of powder may be deposited as the print head traverses well 12, and selected regions of that layer may be bound together to form bound regions of the layer.

In general, the thickness of the layer is controlled such that the binder jetted by the binder deposition unit 15b will not only penetrate the full thickness of the layer, and thus bind the full thickness of the layer together, but will also penetrate through to the layer below sufficient to bind the bound portions of a layer with the bound portions of an underlying layer. If thicker layers are to be deposited, the control unit may inverse the quantity of binder deposited per area of deposited layer, and may reduce the quantity if thinner layers are to be deposited.

Figure 2:
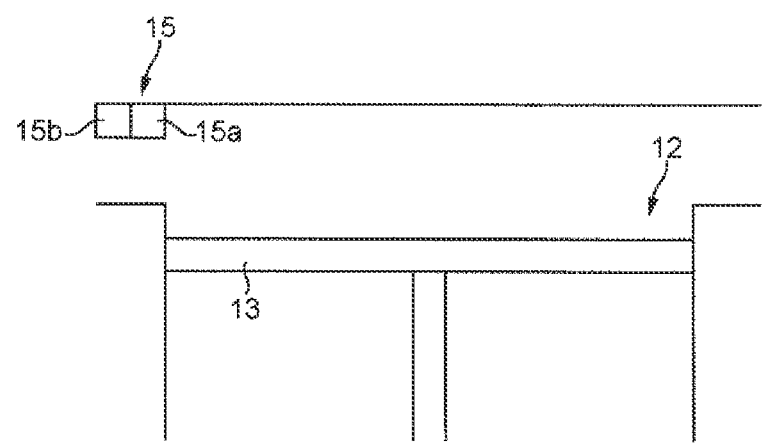
Figure 3:
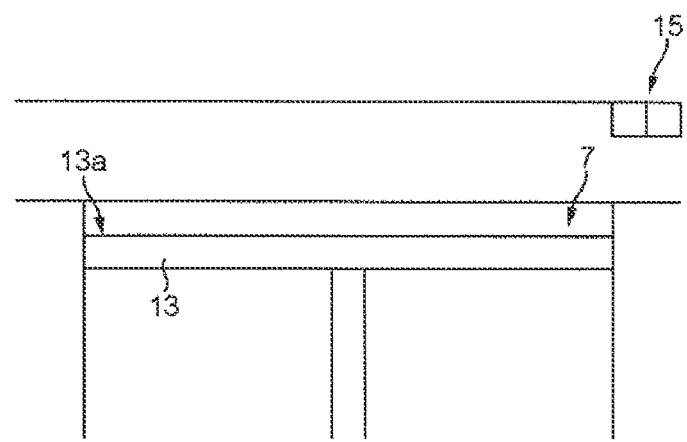
Figure 4:
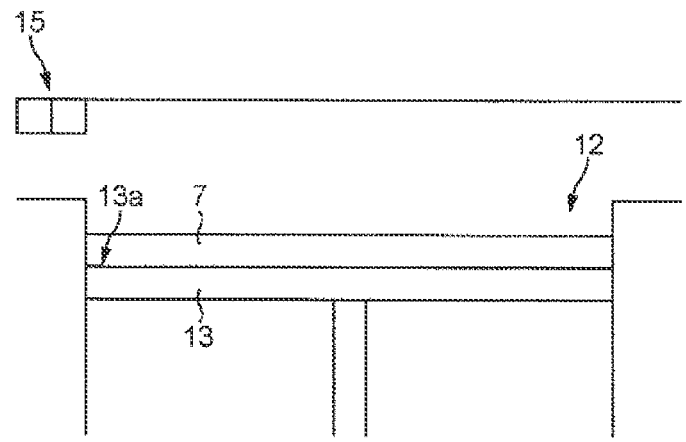

In the configuration shown in FIG. 2, support plate 13 has been lowered from surface 11a by at least the thickness of one layer of construction material to be deposited. From the position shown in FIG. 2, print head 15 traverses well 12 and deposits a layer of construction material from the construction material deposition unit 15a while binding portions of the deposited layer together with binder deposited from the binder deposition unit 15b. This results in the configuration shown in FIG. 3, in which a layer 7 of construction material having portions selectively bound together is located in well 12 on upper surface 13a of support plate 13, and in which print head 15 is now on an opposite side of the well to the starting position shown in FIG. 2. From the position shown in FIG. 3, print head 15 returns to the starting position as shown in FIG. 2, and support plate 13 is further lowered by the thickness of another layer, as shown in FIG. 4. Subsequently printed layers may have the same thickness as the first layer, or may have different thicknesses. In the present configuration, it is assumed that all layers have the same thickness, for simplicity.

Figure 5:
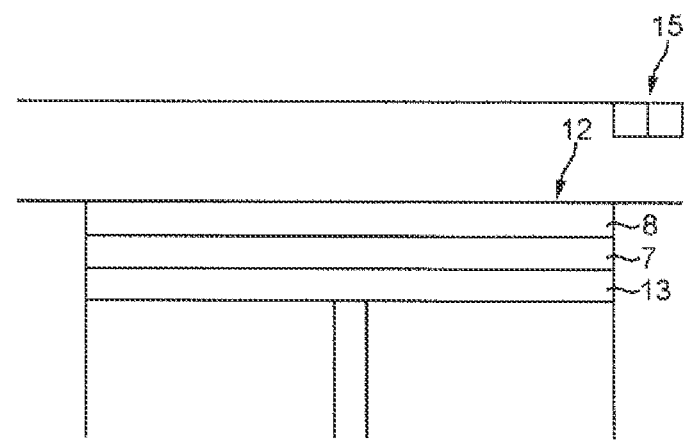
Figure 6:
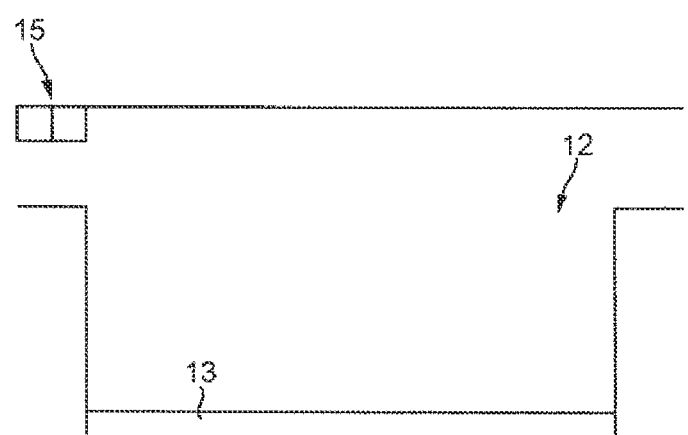

From the configuration shown in FIG. 4, a further pass of print head 15 is made across well 12 so as to deposit a further layer 8 on top of layer 7 in well 12 as described in connection with the transition from FIG. 2 to FIG. 3, as shown in FIG. 5. Portions of layer 8 are joined together and the binder sufficiently penetrates layer 8 so as to join the joined portions of layer 8 to joined portions of layer 7 lying directly below. The process in the transition from FIG. 4 to FIG. 5 is then repeated for a desired number of layers, the number and thickness of layers and locations on each layer at which binder is deposited being controlled according to a design for the object to be produced. Eventually, a the final layer is printed, and optionally after a baking process to cure the binder, the printed object is removed from well 12 resulting in the configuration shown in FIG. 6. From this configuration, support plate 13 may be raised by piston 14 to achieve the configuration shown in FIG. 1, from which point printing may again begin.

Control of manufacturing apparatus 10, and specifically control as to at least the locations on each layer at which binder is deposited is conducted by a control unit (not shown) according to a predetermined set of manufacturing instructions which define the object to be manufactured. Typically, for an apparatus as shown in FIG. 1, the manufacturing instructions define a series of successive slices through the object to be manufactured, each slice representing a single layer to be deposited together with information as to the locations on each layer at which binder is to be deposited and therefore at which the granules making up the layer are to be joined together. Such information can be provided, for example, as a set of deposition vectors on successive XY planes, or alternatively, as a set of pixel images of sequential XY planes.

In some configurations, the control unit may be configured to accept object definition information in other formats and to control the apparatus 10 to produce objects defined by such data by appropriately processing the object data into data defining a series of layers. For example, an object may be defined by CAD data defining the object as a set of surfaces enclosing regions of the object which are to be bound together, as a composite structure formed from a set of geometrical primitives, or as voxel data on a 3D raster grid. To handle such representations, the control unit may divide the object to be manufactured as represented by the object data into a series of planes or slices, and may then determine the locations on each plane or slice at which binder is to be deposited to form the object to be manufactured.

Figure 7:
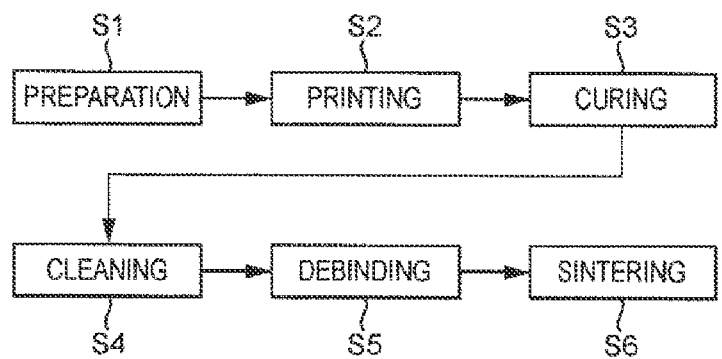
FIG. 7 shows a flow chart for an additive manufacturing process.

The manufacturing process shown in FIGS. 1 to 6 and implemented by the manufacturing apparatus may be part of a larger manufacturing process as shown in FIG. 7. In the process shown in FIG. 7, the printing process shown in FIGS. 1 to 6 is represented as step S2. Prior to the printing process, the granular construction material used in the printing process may be prepared in a preparation step, for example may be cleaned to remove surface impurities, or may be surface treated to activate the surface so as to better bind with the applied binder. Such preparation process is indicated in FIG. 7 of step S1.

Following the printing process, if curing of the binder did not occur during the printing process, the binder may be cured, for example by heating the object to a curing temperature in step S3. Such a step may be carried out in the well of the manufacturing apparatus or elsewhere. Next, the object may be cleaned to remove excess unbound powder from the external surface of the object, for example using liquid or gas jets and/or vibration to remove the excess construction material in step S4.

Next, a debinding step may be performed, indicated as step S5, in which the temperature of the object is raised, and/or an appropriate atmosphere is applied, so as to evaporate or decompose the binder. For example, depending on the binder or the powder, debinding can occur at an elevated temperature lower than the sintering temperature, or may occur at room temperature.

For example, the debinding temperature may be no more than 90%, no more than 80%, no more than 70% or no more than 60% of the melting point of the construction material. Debinding can be carried out, for example, under an air atmosphere, a low vacuum, such as less than 800 mBar, a moderate vacuum, such as less than 1 mBar, or a high vacuum, such as less than 0.001 mBar, a reactive atmosphere such as catalytic atmosphere, an oxidising atmosphere or a reducing atmosphere, or an inert atmosphere such as nitrogen or argon. Oxidising atmospheres can include oxygen gas. Catalytic atmospheres can include nitric acid. Reducing atmospheres can include hydrogen gas. The choice of debinding conditions will depend on the binder used and the composition of the construction material, and can be optimised by those skilled in the art by straightforward experiment.

Finally, in step S6, the object may be heated to an elevated temperature and maintained at that temperature such that the granular construction material sinters together, in step S6. Steps S5 and S6 may be carried out at the same location, for example in a thermal treatment chamber, or elsewhere. A sintering temperature may be, no more than 90%, no more than 80%, or no more than 70% of the melting point of the construction material.

In prior approaches to the sintering of green objects, such as those manufactured by additive manufacturing and those manufactured by other processes such as direct injection metal moulding, it has been usual to place the object on a support platform, such as a metal or ceramic plate, which supports the green object prior to and during the sintering process. However, in such prior processes, it is observed that the object after sintering is deformed from the intended configuration.

The present inventors, having noticed this phenomenon, and without wishing to be bound by any particular theory, have suggested that the observed deformation in part results from the shrinkage of the green objects during the sintering, as the object density increases. Specifically, the green object shrinks during the sintering while the support platform either does not shrink or slightly expands, such that interaction forces between the object and the support platform tend to deform the object. Green objects formed by 3D printing can be especially fragile in this regard, and can be particularly susceptible to such deformation.

Therefore, the present inventors hereby disclose an approach in which a green object to be sintered is placed on a support which exhibits comparable or substantially identical linear shrinkage. Particularly, if a support is provided which is formed as a green support body in a similar fashion to the object to be sintered, such that the green support body is also formed of a granular construction material bound together by a binder, as the green object body shrinks during the sintering process, the support body will also shrink during the sintering process. The interaction forces between the support body and the object body will accordingly be reduced. Deformation of the object body is thus less likely to occur, and may be reduced or eliminated. While the green support body does not need to be made of the same construction material and binder, or indeed by the same process or in the same process as the green object body, since similarity of the shrinkage of the bodies avoids the deformation, the similarity of the shrinkage can be assured by manufacturing the green support body with the same materials, by the same process, or even in the same process as the green object body. Alternatively, the green support body may be made from different materials or in a different process, so that the cost or time for manufacturing the green support body may be less than the cost or time for manufacturing the green object body. In some circumstances, the green support body could be manufactured by metal injection moulding, while the green object body could be formed by 3D printing, each process using a similar granular construction material and binder as the other. However, as will be further explained below, it may be preferred in many circumstances to manufacture both objects using the same process, preferably via a 3D printing process, such that the shape of the support may be adapted to the shape of the object which is to be supported, providing a green support body and green object body which is to be supported by the support body in the same process.

Figure 8:
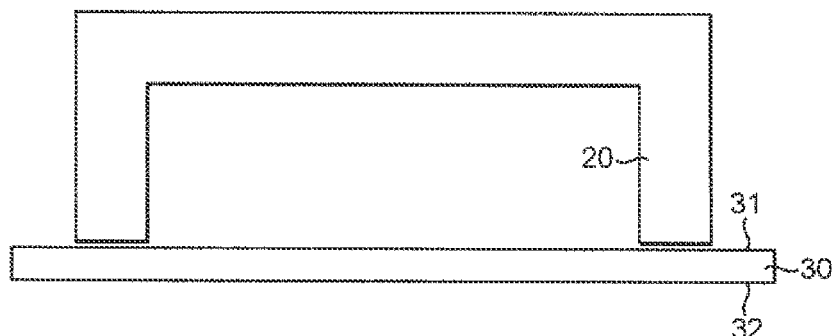
FIG. 8 represents a green object together with a support resulting from an implementation of the present disclosure.

For example, one configuration according to the present disclosure is shown in FIG. 8. In FIG. 8, a green object body 20 is supported on a green support body 30. Green object body 20 here has the form of an inverted horseshoe, but may take any desired shape. Support body 30 here takes the form of a flat plate arranged to totally underlie green object body 20 such that green object body 20 is supported by an upper support surface 31 of green support body 30. Green support body 30 may then be placed into a sintering chamber for a sintering process such that base surface 32 of green support body 30 is in contact with the base of the sintering chamber.

The construction materials and binders of the green object body and the green support body are selected such that when the green object body 20 is sintered while being supported on green support body 30, the linear dimensions of the green support body 30 and the green object body 20 proportionally reduce by the same amount or by a similar amount, and no or little interaction force will arise therebetween so as to deform green object body 20 before the sintering is complete. Accordingly, the configuration shown in FIG. 8 may address the problem of deformation of green objects during sintering.

A similar effect may be achieved by supporting only a part of the green object body, being a more susceptible portion of the green object body to deformation, by the green support body. In such a configuration, the green support body need not totally underlie the green object body.

Figure 9:
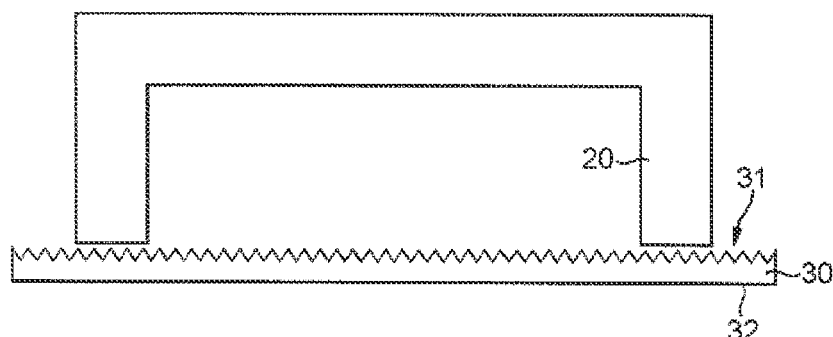
FIG. 9 represents a variant to the configuration of FIG. 8.

FIG. 9 shows a variant configuration, in which upper support surface 31 of green support body 30 is provided with ridges or corrugations having the form of peak protrusions bordering trough recesses in at least a region of surface 31 which comes into contact with green object body 20. In the shown configuration, although optional, the entire upper surface of support body 30 is provided with such corrugations. By providing such corrugations, or alternatively by providing a textured, patterned, apertured, recessed, or ridged contact surface of support body 30 with green object body 20, the contact surface area between these bodies can be appropriately reduced. By providing such a reduced contact surface, adhesion between the green support body and the green object body prior to and/or during sintering can also be reduced.

Figure 10:
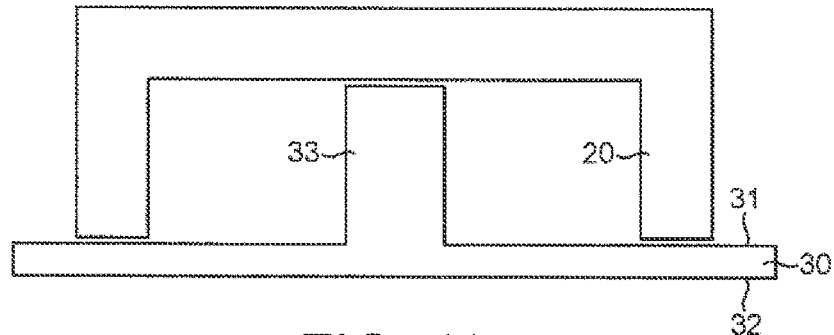
FIG. 10 represents another variant to the configuration of FIG. 8.

A further variant is shown in FIG. 10. In FIG. 10, the support portion 30 is provided with projection 33 which extends upwardly from support body 30 to support a recessed or concave portion of green object 20, which is recessed or concave relative to a lower contact surface of the green object body with the support portion. Configurations as shown in FIG. 10, which may have one or more projections extending upwardly from the surface of green support body 30 in correspondence with one or more recessed or concave portions of object 20 can avoid the tendency of a green object to sag or otherwise deform under its own weight before or during the sintering process while avoiding deformation due to uneven shrinkage.

Figure 11:
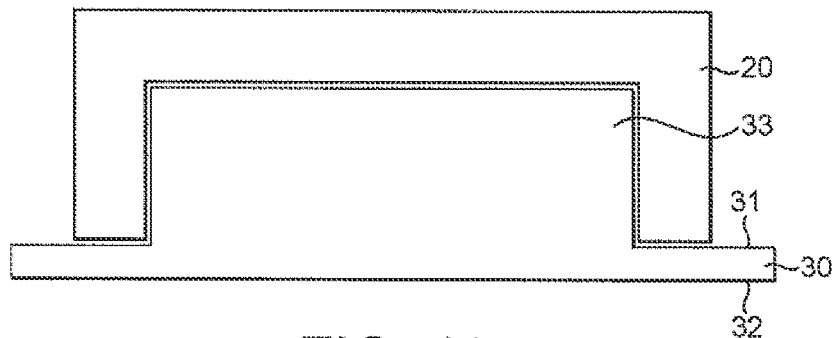
FIG. 11 represents yet another variant to the configuration of FIG. 8.

FIG. 11 shows a further variant approach to this process, in which an upper surface 31 of green support object 30 is provided with a projection 33 which conforms in shape and dimensions to a concavity in the lower surface of green object body 20. Although the object shown in FIG. 11 is relatively simple in form, it can be imagined that object 20 could have a more complex form, and then projection 33 could be adapted in shape to correspond and conform to the shape of object 20 so as to provide excellent support to the object, even inside concave regions of the object. By such a configuration, excellent inhibition of both deformation due to sagging and deformation due to shrinkage can be achieved. It will be appreciated that configurations such as those in FIG. 11 could not be achieved by a conventional support made of metal or ceramic which does not have a tendency to shrink, or which may have a tendency to expand, since the interaction of the green object shrinking with the metal or ceramic support object could cause severe deformation or damage to the object during the sintering process.

Configurations according to the present disclosure may advantageously be formed by producing the green object and the green support body in the same 3D printing process. Doing so particularly allows the shape and dimensions of the green support body to be selected to most appropriately match, and thereby support, the shape of the green object body. The process for producing the support body and object body together may be similar, as an example, to that shown in FIGS. 1 to 6, in which in a first plurality of layers, selective deposition of binder on each layer is used to build up at least a portion of the green support body, after which at least a portion of the green object body representing the object to be manufactured is produced by selective deposition of binder into a second plurality of layers, subsequently deposited to the first plurality of layers. Notably, and with exemplary reference to FIG. 11, it can be understood that one or more intermediate layer of the first and second plurality of layers can include bound regions belonging both to the object body and the support body, for example with reference to FIG. 11, layers including a portion of projection 33 may also include parts of object body 20.

By such an approach, the green object body and the support object body can together be manufactured, can together be removed from the build well, and can then be cleaned, be subject to debinding, and can then together be sintered, the support body being appropriately adapted to support the desired object.

In some configurations, a weak connection can be provided between the green object body and the green support body by providing the first layer of the object body on top of the final layer of the green support body during the additive manufacturing. Especially when an interrupted surface as shown in FIG. 9 is provided between the green support body and the green object body, the weak connection can easily be broken by simple mechanical means. In other configurations, a gap between the green support body and the green object body may be provided which is filled with unbound construction material. With reference to, for example, FIGS. 10 and 11, this need not mean that entire deposited layer during the manufacturing process need be left in an unbound state, but rather that the bound portions defining the object body and the bound portions defining the green body are not contiguous and are separated by unbound material in all directions. Again with reference to FIG. 11, it can be understood that an intermediate layer including a portion of projection 33 may also include parts of object body 20, but that at all positions between object body and support body 30, a gap may exist to enable separation.

In the above, it has been described how, by appropriate operation of an additive manufacturing apparatus, an object may be manufactured together with an appropriate support body which, when sintered, can avoid deformation.

Additionally, the concepts herein disclosed can also be used to transform object definition data describing the form of an object to be manufactured such that, when the object definition data is used as an input to or in controlling a conventional 3D printing apparatus, advantageous results may be achieved.

Figure 12:
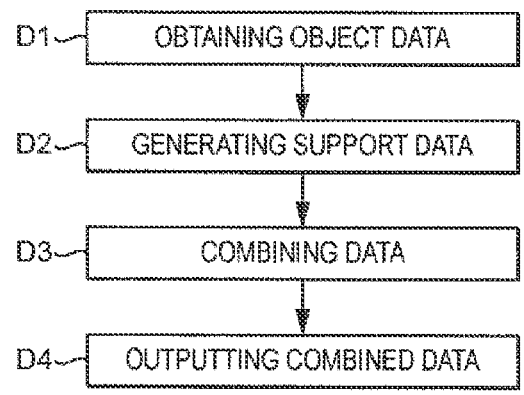
FIG. 12 shows a flow chart representing a method of processing data being an implementation of the present disclosure.

Once such method for transforming object data will now be described with reference to FIG. 12. FIG. 12 shows a flow diagram for process of transforming object data, which is data describing an object to be manufactured in three dimensions, to obtain data representing the same object together with an appropriate support structure such that the support structure can be used to support the object during sintering to avoid deformation as described above.

In the first process D1 shown in FIG. 12, object data is obtained. This object data may be output of computer aided design (CAD) software, and may represent the object to be manufactured as a series of surfaces enclosing solid portions of the object, may define the object as a composition of a predetermined set of geometrical primitives or may represent the object as a set of voxels defining the object on a raster grid in 3D space. Alternatively, the object data may already be represented as a series of slices through an object, dividing the object into layer, each layer having defined regions to be bound together, such as is conventionally used to control a 3D printing apparatus.

In step D2 of the method of FIG. 12, the object data representing the object to be manufactured is processed to generate data representing a support object. This may be achieved by a variety of approaches, which may depend on a format in which the input data is provided. For example, a plane may be determined by calculation which represents a surface on which the object is notionally able to rest. Then, heights of various exterior portions of the object facing this plane and arranged above this plane may be identified, and corresponding projection heights identified to define one or more projections for supporting concave portions of the object. Alternatively, using a recursive algorithm, the heights of each of different portions of a supporting surface may be in turn increased until the respective portion of the supporting surface is calculated to contacts the object, after which the height of another portion of the supporting surface is adjusted, such that a surface bounding the various portions of the supporting surface approximates a concave portion of the object.

The support object data obtained in process D2 is then combined in process D3 with the previously obtained object data to generate data representing the combination of the support body and the object body. For example, where the object data and the support data are each represented as raster grids for successive layers, each grid having logical 1 values representing locations where binder is to be dispensed and logical 0 values representing locations where binder is not to be dispensed, the combination of the object data and the support data can be achieved by a logical AND operation between the raster grids representing corresponding layers of the combination object.

The data representing the combination of the object body and the support body is then, in process D4, outputted from the process in a suitable format, such as any of those formats previously indicated as being suitable for input to the process. In some configurations, and especially in configurations in which the output process D4 is used directly to control an additive manufacturing apparatus, the output may be provided as a series of raster grids representing sequential layers to be deposited in the additive manufacturing process.

Figure 13:
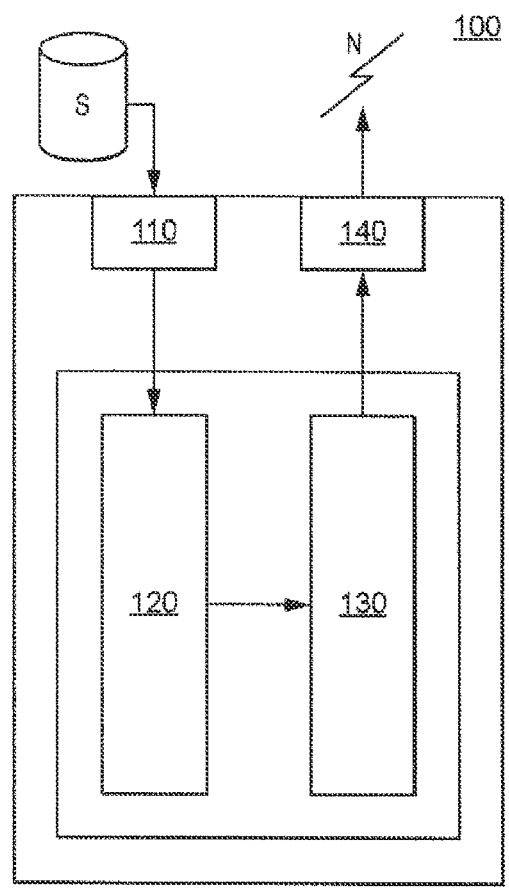
FIG. 13 represents an apparatus for processing object data being an implementation of the present disclosure.

The process of FIG. 12 may be implemented in an object data processing apparatus 100 as shown as FIG. 13. Apparatus 100 is a data processing apparatus adapted for performing the method of FIG. 12. In FIG. 13, apparatus 100 is represented by a series of discrete modules. These may be implemented as hardware modules, such as discrete microprocessors or data processing units, where they are integrated on the same chip, provided on discrete boards, or provided as distinct parts of a larger data processing system. Alternatively, each of the modules may be provided as a software module running on one or more microprocessors as may be known in the art Apparatus 100 has an object data obtaining unit 110 adapted to read object data from a data source, indicated by data storage unit S. However, obtaining unit 110 may also obtain object data from, for example, a network store, a data stream from another data processing unit, or may obtain object data by reading from, for example, a laser scanner or other object metrology system capable of obtaining data representing a 3D object as may be known in the art.

The object data obtained by obtaining unit 110 is transmitted to support data generation unit 120. Support data generation unit 120 operates on the obtained object data to generate data representing a corresponding support object. The data representing the corresponding support object is then transmitted from the support data generation unit to the data combination unit 130, in which the data representing the object body is combined with the data representing the support body to result in data representing the combination. The combined data thus generated is passed to output unit 140, in which the data is appropriately formatted and outputted. In the example shown in FIG. 13, the object data is output to a network N, but also could be output to a local data store or any other device capable of handling the data. In one variant, the output data may be used directly to control a manufacturing apparatus as shown and described with regard to FIGS. 1 to 6.

It is also possible for the concepts of this disclosure to be distributed as a software module, either for execution on a general-purpose computer or for execution in the control systems of a conventional manufacturing apparatus. In the latter case, especially, conventional object data may be provided by the user of the apparatus, and the manufacturing apparatus itself then acts to generate the corresponding support data and to manufacture the object in combination with the support in accordance with the present disclosure. The data processing apparatus may be provided as part of a conventional manufacturing apparatus either as a hardware unit or as software, for example executed in a control unit at the conventional manufacturing apparatus. Such software may be distributed as the data carrier comprising a machine-readable representation of software instructions which, when executed by a suitably-configured processor, cause the processor to perform a method in accordance with the concepts of the present disclosure.

It goes without saying that the above disclosure should be considered purely exemplary, and that the present disclosure may be embodied in a wide variety of configurations, by substitution, variation, omission, or addition of various elements so as to achieve various engineering requirements. Accordingly, the appended claims are considered to provide particular combinations of subject-matter, which may provide the advantages of the present disclosure.

The invention claimed is:

1. A method of manufacturing an object, comprising:
depositing a first plurality of layers of a construction material;
selectively binding portions of each deposited layer of the first plurality of layers to form a green support body;
depositing a second plurality of layers of a construction material;
selectively binding portions of each deposited layer of the second plurality of layers to form a green object body, the support body being separate from the object body;
cleaning the green object body and the green support body; and
sintering the green support body together with the green object body supported by the green support body, wherein the support body has a supporting surface for supporting the object body, the supporting surface providing an intermittent contact surface for contacting with the object body during the sintering.

2. The method according to claim 1, wherein the green support body has a planar base surface.

3. The method according to claim 1, wherein the intermittent contact surface is formed by at least one of projections, recesses or corrugations of the supporting surface.

4. The method according to claim 1, wherein the green support body is adapted to conform to the shape of the green object body.

5. The method according to claim 4, wherein the green support body is adapted to contact the green object body at a plurality of positions on the green object body.

6. The method according to claim 1, wherein the green support body is dimensioned so as to support the entirety of the green object body.

7. The method according to claim 1, wherein the green support body is separate from the green object body.

8. The method according to claim 1, further comprising a debinding process of the green object body supported by the green support body before the sintering process.

9. The method according to claim 1, wherein the green support body and the green object body are formed of the same construction material bound by the same hinder.

10. The method according to claim 1, wherein the green support body is adapted to conform to the shape of the green object body.

11. The method according to claim 1, wherein the green object body and the green support body exhibit substantially the same percentage of linear shrinkage during the sintering.

* * * * *